Oct. 2, 1956
J. L. HATTE
2,765,044
SOUND FILTERING APPARATUS
Filed July 16, 1952
2 Sheets-Sheet 1
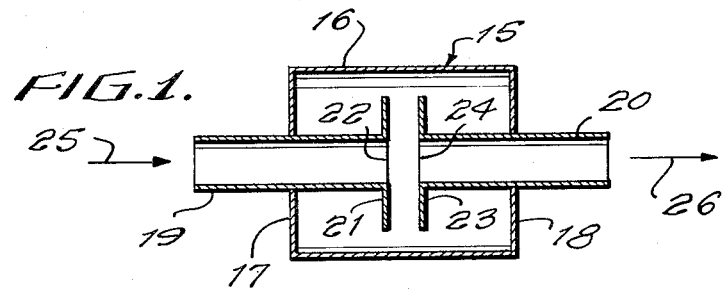
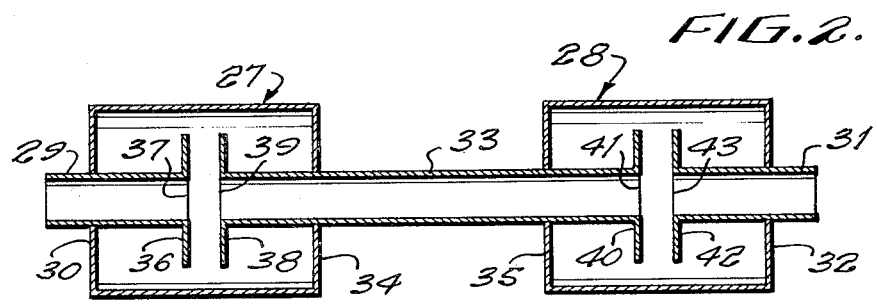
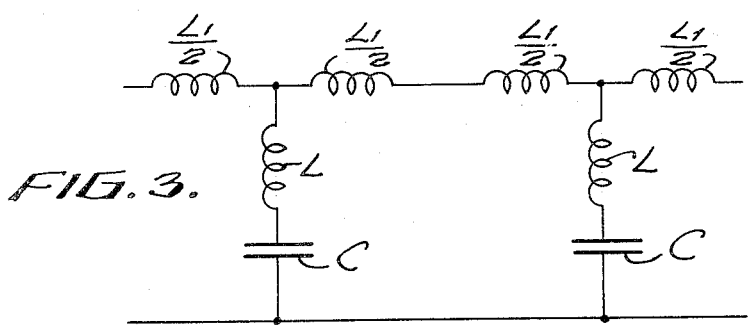
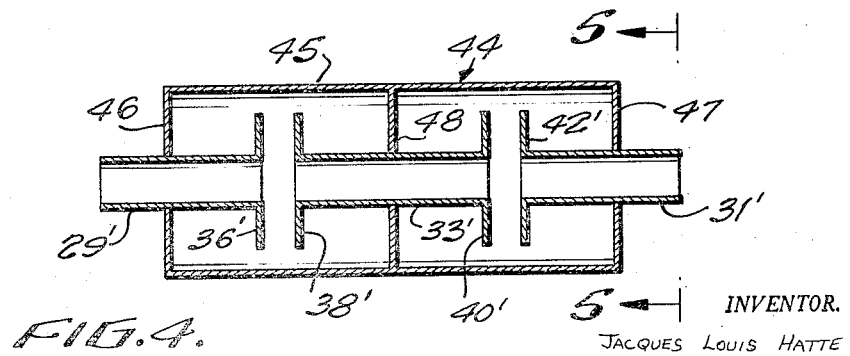
INVENTOR.
JACQUES LOUIS HATTE
BY Oct. 2, 1956 — J. L. HATTE — 2,765,044
SOUND FILTERING APPARATUS
Filed July 16, 1952 — 2 Sheets-Sheet 2

INVENTOR.
JACQUES LOUIS HATTE
BY

United States Patent Office 2,765,044
Patented Oct. 2, 1956

2,765,044

SOUND FILTERING APPARATUS

Jacques Louis Hatte, St. Just-sur-Loire, France

Application July 16, 1952, Serial No. 299,099

Claims priority, application France July 18, 1951

5 Claims. (Cl. 181—47)

The present invention relates to sound filtering apparatus.

More particularly the present invention relates to a sound filtering apparatus which is suited for use as a muffler of an automobile, or the like, although the sound filtering apparatus of the present invention is not necessarily limited to such a use.

Mufflers for the engines of automobiles and the like operate under the most varied principles. For example, many well known mufflers utilize intricately arranged baffles to send the exhaust gases through an intricate path which reduces the noise. Also, many mufflers utilize absorbent substances such as particles of metal, wadding of different materials, etc. to break up the path of the escaping exhaust gases and reduce the noise. All of these well-known muffler constructions are of a particular disadvantage because they require considerable amount of energy to move the exhaust gases through the obstructions placed in the path of the same, and this extra energy required by the known mufflers reduces the efficiency of the engine.

It is an object of this invention to overcome the above disadvantages by providing a sound filtering apparatus which reduces the noise of the exhaust and which at the same time does not materially obstruct the flow of the exhaust gases so that the efficiency of the engine is not appreciably diminished.

It is a further object of the present invention to provide a sound filtering apparatus which is capable of filtering out substantially all sounds which are audible to the human ear.

Yet another object of the present invention is to provide a sound filtering apparatus which is of an extremely simple and inexpensive construction and which can be made of readily available materials.

Still another object of the present invention is to provide a sound filtering apparatus which is capable of mechanically filtering sound waves of predetermined frequencies.

With the above objects in view, the present invention mainly consists of a sound filtering apparatus having an elongated housing provided with a tubular side wall and opposite end walls. A tubular conduit means is arranged within this elongated housing, extends in the longitudinal direction thereof, and is spaced from the tubular side wall thereof, this conduit means having opposite end portions projecting outwardly through the end walls of the housing. A passage means is located within the housing and extends transversely to the length thereof, this passage means being spaced from the end walls and the tubular side wall of the housing and extending from the tubular conduit means toward the tubular side wall of the housing and communicating with the interior of the tubular conduit means and the interior of the housing so as to provide a communication between the latter and the interior of the tubular conduit means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a side, sectional view of one unit constructed in accordance with the present invention;

Fig. 2 is a side, sectional view of a pair of units of the type shown in Fig. 1;

Fig. 3 is a wiring diagram illustrating the analogy between an electrical filter and the construction of Fig. 2;

Fig. 4 is a side sectional view of yet another embodiment of a sound filtering apparatus constructed in accordance with the present invention;

Figure 6:
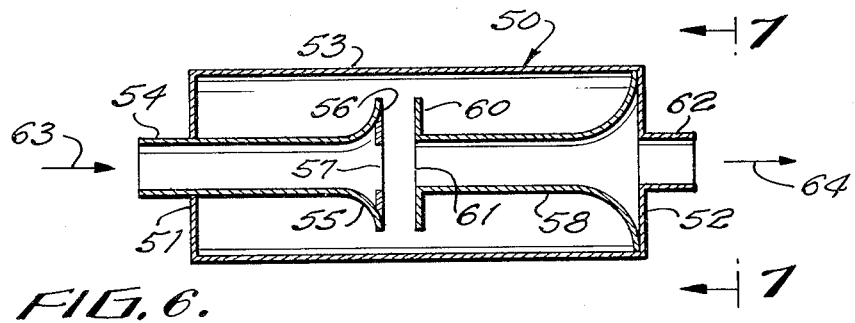
Fig. 6 is a side, sectional view of yet another embodiment of a sound filtering apparatus constructed in accordance with the present invention.

Referring now to the drawings, there is shown in Fig. 1 an elongated housing 15 having a tubular side wall 16 and opposite end walls 17 and 18. A tube 19 passes through the end wall 17 in the direction of the length of housing 15, while a tube 20 passes through the end wall 18 in the direction of the length of housing 15, the tubes 19 and 20 being coaxial with each other and with the central longitudinal axis of housing 15, which may, for example, be cylindrical or elliptical in cross section. Fixed to the inner free end of tube 19 is a disc 21 extending transversely to the length of housing 15 and having a central aperture 22 communicating with the interior of tube 19. A disc 23 parallel to the disc 21 is fixed to the inner free end of tube 20 and is formed with a central aperture 24 communicating with the interior of tube 20.

The exhaust gases flowing from the engine enter the housing 15, in the direction of arrow 25, through the tube 19, and these gases leave the housing 15 in the direction of arrow 26, through the tube 20. As the gas passes through the housing 15, it is acted upon by the frictional resistance provided by the tubes 19 and 20 which produces a mechanical self-inductance in the sound waves, and the gas expands in the spaces between the discs 21 and 23 and in the space of the housing 15, this expansion acting as a mechanical capacitor so that the combination of inductance and capacitance effects produces a mechanical sound filtering action which is analogous to the filtering produced by electrical filter circuits, as will be fully explained below. The mechanical filtering of sound waves has been clearly demonstrated by devices such as Helmholtz resonators which are used to analyze sounds.

The structure of Fig. 1 represents one embodiment of a basic unit of a sound filtering apparatus construction in accordance with the present invention. These basic units may be combined in various ways such as those shown in Figs. 2 and 4, respectively. In the apparatus of Fig. 2, a pair of housings 27 and 28, similar to the housing 15, are provided. A tube 29 passes through the end wall 30 of housing 27 in the direction of the length of the latter and has a free end located within the housing 27. A tube 31 passes through the end wall 32 of housing 28, along the central axis of the latter, and has a free end located within the housing 28. A third tube 33, coaxial with the tubes 29 and 31 and with the longitudinal central axes of housings 27 and 28, passes respectively through the end walls 34 and 35 of the latter and has opposite free ends respectively located within the housings 27 and 28 adjacent to the free ends of the tubes 29 and 31. A disc 36 is fixed to the free end of tube 29, extends transversely to the length of the housing 27 and is formed with a central aperture 37 communicating with the interior of tube 29. A disc 38, parallel to disc 36, is connected to the left free end of tube 33, as viewed in Fig. 2, and is formed with a central aperture 39 communicating with the interior of tube 33. A disc 40 is fixed to the right end of tube 33, as viewed in Fig. 2, and is formed with a central aperture 41 communicating with the interior of tube 33. A disc 42 is fixed to the free end of tube 31 within the housing 28 and is provided with a central aperture 43 communicating with the interior of tube 31. All of these discs 36, 38, 40 and 42 are identical, parallel to each other, and extend transversely to the axes of the tubes 29, 33 and 31 in housings 27 and 28.

To best understand the operation of the structure of Fig. 2, it is advisable to refer to electrical filter circuits which are analogous to the mechanical sound filtering produced by the above-described structure. In the field of electrical sound filters, there are low-pass filters, which are characterized by a horizontal set of inductors connected in series with each other and electrically interconnected with a plurality of condensers extending vertically and connected in parallel with each other. There are also high-pass filters, which are just the reverse of the low-pass filters in that the capacitors, i. e., condensers, are located in series along a horizontal line, while the inductors extend vertically and are interconnected in parallel with each other and with the horizontal line of condensers. The low-pass filters filter out all frequencies above a predetermined cut-off frequency, so that those frequencies below this cut-off frequency are permitted to pass, and the high-pass filters are just the opposite in that they allow passage of all frequencies above a predetermined cut-off frequency.

By combining low-pass and high-pass filters, there may be provided what is known as a band-pass filter, which permits the passage of all frequencies between predetermined upper and lower cut-off frequencies. An electrical band-pass filter arrangement is illustrated in Fig. 3 of the drawings where the inductors designated L1/2 correspond to the mechanical inductance produced by the tubes 29, 33 and 31. The inductors L correspond to the discs 36 and 38, on the one hand, and 40 and 42, on the other hand. The capacitors C correspond to the volumes of the housings 27 and 28, so that the structure of Fig. 2 is in every way analogous to the band-pass filter of Fig. 3 and may have the parts designed to permit passage of sound waves located between upper and lower predetermined cut-off frequencies.

Figure 5:
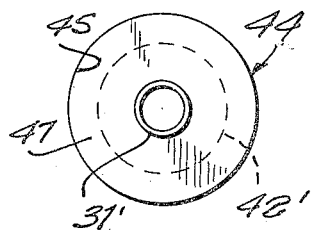
Fig. 5 is an end view of the apparatus of Fig. 4 taken along line 5—5 of Fig. 4 in the direction of the arrows.

The apparatus of Fig. 4, which is shown in end view in Fig. 5, is identical with the structure of Fig. 2 except for the arrangement of the housing. Thus, in Fig. 4 the tubes 29′, 33′ and 31′ are identical with the tubes 29, 33 and 31, while the discs 36′, 38′, 40′ and 42′ are identical with the discs 36, 38, 40 and 42, the discs and tubes of Fig. 4 being interconnected in the same way as the discs and tubes of Fig. 2. These discs and tubes of Fig. 4 are all located, as illustrated, within a single elongated housing 44 having a tubular side wall 45 and opposite end walls 46 and 47 through which the tubes 29′ and 31′ extend. The housing 44 is divided into two parts by a central partition 47 formed with a central aperture, through which tube 33′ extends, and being parallel to the discs 36′, 38′, 40′ and 42′, this partition 47 being symmetrically arranged in the housing 44 and with respect to the pairs of discs on the opposite side of this partition 47. It is believed to be apparent that the structure of Fig. 4 will operate, in the same way as the structure of Fig. 2, as a band-pass filter for mechanically filtering all sound frequencies above and below a pair of predetermined cut-off frequencies.

In the well-known Helmholtz resonators, the sphere corresponds to a condenser and the tube corresponds to an induction, and in the same way the interior of the above-described housings operate as condensers and the friction produced by the tubes and discs operate as inductors. It is possible with the arrangements described above to design the parts in such a way that they pass only frequencies which are inaudible to the human ear so that an effective reduction in the noise from the exhaust of an engine, for example, is provided, while at the same time any appreciable resistance to the movement of the exhaust gases is eliminated so that the efficiency of the engine is not reduced. Experience has shown that the above-described discs must be separated from each other by a distance which is extremely small as compared to the length of the housings. The distance between these discs is shown on an enlarged scale in the drawings for the sake of clarity. Actually these pairs of opposite discs should never be located from each other by a distance which is greater than one-fifth of the length of the housing in which the discs are located, or in the case of Fig. 4, one-fifth of the length of the distance between either end wall 46 and 47 and the partition 48. It is preferred, however, to keep this distance between the discs at a value lower than one-eighth of the length of the housing. It has also been found by experience that the discs should have a diameter of between one-half and four-fifths of the diameter of the housings in which the discs are located. It has also been found by experience that the diameters of the tubes described above should be between one and three-tenths of the diameters of the housing in which they are located.

In order to produce an effective filtering, it is necessary that the outlet of the apparatus have an impedance equal to the characteristic impedance of the apparatus, and the parts are so designed that this latter value is equal to the resistance produced by the charge of air tending to form spherical waves in the atmosphere of the outlet of the device. When this condition is realized, there is a filtering of the sound so that the noises of the exhaust are eliminated while the exhaust gases may escape freely to the atmosphere.

The above-described apparatus may be made of sheet metal which may be either iron or steel or any other metal capable of resisting oxidation at the temperature of the exhaust gases. It is preferred to have each of the housings, or housing portion produced by a member such as partition 48, of a length substantially equal to its diameter.

The actual dimensions of the parts will, of course, vary with the engine to which the invention is attached. As a specific example however, for a 15 horse power engine of four cylinders the apparatus of Fig. 5 would have the following approximate dimensions:

|  | Cm. |
|---|---|
| Exterior diameter | 9–15 |
| Diameter of the discs | 8–12 |
| Diameter of the tubes | 3–5 |
| Total length | 30–40 |

Instead of constructing a sound filtering apparatus on a band-pass principle, as described above, it is also possible to construct a sound filter apparatus, in accordance with the present invention, which will operate on the principle of a band-elimination filter. This latter type of filter, which is well known in the electrical arts, is just the opposite the band-pass type of filter in that it eliminates all frequencies between predetermined upper and lower limits. Thus, this type of filter arrangement is particularly suitable for mufflers because it is possible to construct an apparatus which will have a lower cut-off frequency too low to be audible to the human ear and an upper cut-off frequency too high to be audible to the human ear, so that by eliminating all frequencies between these limits a very effective muffler is provided.

Figure 8:
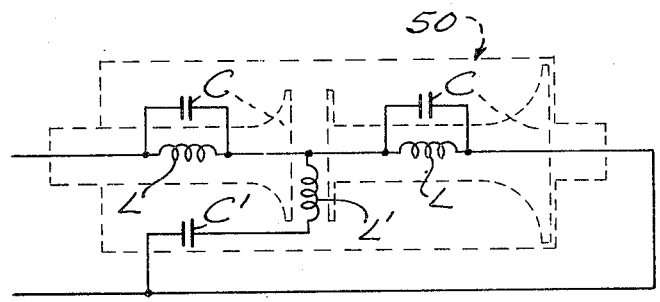
Fig. 8 is a wiring diagram illustrating the analogy between the apparatus of Fig. 6 and an electrical filter.
Figure 9:
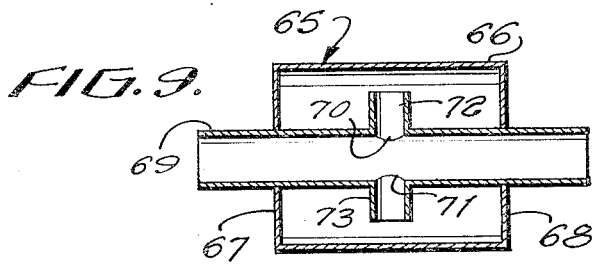
Fig. 9 is a side sectional view of a still further embodiment of a sound filtering apparatus constructed in accordance with the present invention.
Figure 7:
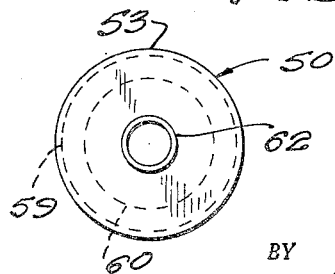
Fig. 7 is an end view of the structure of Fig. 6 taken along line 7—7 of Fig. 6 in the direction of the arrows.

Figs. 6 and 9 respectively show two constructions which operate on the band-elimination filter principle. In the construction of Fig. 6, which is shown in end view in Fig. 7, there is provided an elongated housing 50 having opposite end walls 51 and 52 and having a tubular side wall 53. The end wall 51 is formed with a central aperture through which a tube 54 extends, this tube 54 terminating within the housing 50 in an enlarged, tapered free end 55 connected to a disc 56 extending transversely to the length of housing 53 and formed with a central aperture 57 providing communication between the interior of tube 54 and the housing 50. Another tube 58 is coaxial with the tube 54 and the longitudinal central axis of housing 50 and has an enlarged, tapered end 59 fixed to the periphery of the end wall 52 on the interior of housing 50, as illustrated. To the left, free end of tube 58, as viewed in Fig. 6, there is connected a disc 60 having a central aperture 61 communicating with the interior of tube 58, this disc 60 being identical with the disc 56, being parallel thereto, and both of these discs 56 and 60 extending transversely to the length of the housing 58. To the end wall 52, about the central aperture thereof, there is connected an outlet tube 62 coaxial with the tube 58, the exhaust gases passing into the apparatus, in the direction of arrow 63, through the tube 54 and out of the apparatus, in the direction of arrow 64, through the tube 62. A band-elimination filter is illustrated in Fig. 8 with the corresponding parts of the apparatus of Fig. 6 shown superimposed thereon in dot-dash lines. Thus, the tubes 54 and 58 correspond to the inductors L while the enlarged tapered ends of these tubes correspond to the capacitor C, the discs 56 and 60 corresponding to the inductor L′ and the interior space of the housing 50 corresponding to the capacitor C′, so that the apparatus of Fig. 6 is in every way analogous to a band-elimination filter.

A simplified apparatus, operating as a band-elimination filter, is illustrated in Fig. 9 where the elongated housing 65 has an outer, tubular side wall 66 extending between the end walls 67 and 68. A single tube 69 extends through the end walls 67 and 68 along the central, longitudinal axis of housing 65 and is provided within the center of the housing 65 with a pair of opposite apertures 70 and 71. A tube 72 is fixed at one end to the tube 69, about the opening 70 thereof, and extends transversely to the length of housing 65 toward the side wall 66 thereof. A tube 73 is fixed at one end to the tube 69, about the opening 71 thereof, this tube 73 forming an extension of the tube 72 and also extending transversely to the length of housing 66 toward the side wall thereof.

Referring to the band-elimination filter illustrated in Fig. 8, the tube 69 corresponds to the inductors L, on opposite sides of the tubes 71 and 72, respectively. The tubes 71 and 72 correspond to the inductor L′; the volume of the housing 66 corresponds to the capacitor C′; and the volumes of the tube 69, on opposite sides of the pipes 71 and 72, correspond respectively to the capacitors C.

With the apparatus of Figs. 6 and 9, the length of the housings will be greater than the diameter thereof, although in the embodiment of Fig. 9 the length of the housing 6 will be only slightly greater than the length thereof. Thus, with the apparatus of Figs. 6 and 9 it is possible to eliminate a range of frequencies and in this way produce an effective muffler which does not appreciably resist the flow of exhaust gases.

It will be understood that each of the elements described above, or two or more together, may also find a useful application in other types of sound filtering apparatus differing from the types described above.

While the invention has been illustrated and described as embodied in sound filtering apparatus suitable for mufflers and the like, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A muffler comprising, in combination, a pair of exhaust acoustical-inductor tubes, for carrying away exhaust gases, located about a predetermined axis and being spaced from each other along said axis with a free end of one tube located adjacent a free end of the other tube; a pair of acoustical-inductor discs respectively located in planes normal to said axis and being respectively fixed to said free ends of said tubes, each of said discs being formed with a substantially central opening communicating with the interior of the tube to which it is connected; and an elongated, tubular acoustical-capacitor enclosure located about said axis and also being located about and spaced from said discs, said enclosure having opposite end walls respectively fixed to said tubes, said one tube being enlarged at the portion thereof next to said free end thereof to form a second acoustical capacitor, said other tube being enlarged at the end portion thereof distant from said free end thereof to form a third acoustical capacitor, so that said muffler operates as an acoustical band-elimination filter, said end portion of said other tube being fixed to the inner face of one end wall of said enclosure, and said one end wall of said enclosure being formed with a substantially central opening.

2. A muffler comprising, in combination, a pair of exhaust acoustical-inductor tubes, for carrying away exhaust gases, located about a predetermined axis and being spaced from each other along said axis with a free end of one tube located adjacent a free end of the other tube; a pair of acoustical-inductor discs respectively located in planes normal to said axis and being respectively fixed to said free ends of said tubes, each of said discs being formed with a substantially central opening communicating with the interior of the tube to which it is connected; and an elongated, tubular acoustical-capacitor enclosure located about said axis and also being located about and spaced from said discs, said enclosure having opposite end walls respectively fixed to said tubes, said one tube flaring outwardly next to said free end thereof to form a second acoustical capacitor, said other tube flaring outwardly at its end portion distant from said free end thereof to form a third acoustical capacitor, so that the muffler operates as an acoustical band-elimination filter, said end portion of said other tube being fixed to the inner face of one of said end walls of said enclosure, and said one end wall of said enclosure being formed with a substantially central opening.

3. A muffler as defined in claim 2 and wherein an outlet tube is fixed at one end to said one end wall of said enclosure about said opening thereof and is located at the exterior of said enclosure.

4. A muffler comprising, in combination, a pair of exhaust acoustical-inductor tubes, for carrying away exhaust gases, located about a predetermined axis and being spaced from each other along said axis with a free end of one tube located adjacent a free end of the other tube; a pair of acoustical-inductor discs respectively located in planes normal to said axis and being respectively fixed to said free ends of said tubes, each of said discs being formed with a substantially central opening communicating with the interior of the tube to which it is connected; and an elongated, tubular acoustical-capacitor enclosure located about said axis and also being located about and spaced from said discs, said enclosure having opposite end walls respectively fixed to said tubes, said one tube flaring outwardly next to said free end thereof being fixed to the outer periphery of the disc connected to said free end thereof so as to form a second acoustical capacitor, said other tube flaring outwardly at its end portion distant from said free end thereof and being fixed at said end portion thereof to the inner face of one end wall of said enclosure to form a third acoustical capacitor, said one end wall of said enclosure being formed with a substantially central opening, whereby the muffler operates as an acoustical band-elimination filter.

5. A muffler as defined in claim 4 and wherein an outlet tube is fixed to said one end wall of said enclosure about said opening thereof and is located exteriorly of said enclosure.

References Cited in the file of this patent

UNITED STATES PATENTS

| | | |
|---|---|---|
| 1,692,317 | Stewart | Nov. 20, 1928 |
| 1,781,469 | Mason | Nov. 11, 1930 |
| 1,874,326 | Mason | Aug. 30, 1932 |
| 1,909,394 | Dodge | May 16, 1933 |
| 1,910,672 | Bourne | May 23, 1933 |
| 2,030,178 | Potter | Feb. 11, 1936 |
| 2,401,570 | Koehler | June 4, 1946 |

FOREIGN PATENTS

| | | |
|---|---|---|
| 398,359 | Great Britain | Sept. 14, 1933 |
| 432,372 | Great Britain | July 25, 1935 |